United States Patent
Wuthrich

(10) Patent No.: US 6,802,517 B1
(45) Date of Patent: Oct. 12, 2004

(54) FENDER SKIRT AND METHODS FOR USING SAME

(76) Inventor: Jeffery J. Wuthrich, 25460 200th St., Bloomfield, IA (US) 52537

( * ) Notice: Subject to any disclaimer, the term of this patent is extended or adjusted under 35 U.S.C. 154(b) by 14 days.

(21) Appl. No.: 10/125,017

(22) Filed: Apr. 18, 2002

(51) Int. Cl.⁷ ............................................. B62D 25/18
(52) U.S. Cl. ...................... 280/157; 280/160; 280/850
(58) Field of Search .............................. 280/157, 152.3, 280/152.05, 156, 160, 848, 849, 850, 853, 854, 760, 851, 847, 159, 768; 296/198; 172/112, 509, 512, 513; 180/900; D12/184, 185

(56) References Cited

U.S. PATENT DOCUMENTS

| | | | | |
|---|---|---|---|---|
| 1,049,946 A | * | 1/1913 | Tyrell | 280/157 |
| 2,352,464 A | * | 6/1944 | Aerni | 280/160 |
| 2,530,857 A | * | 11/1950 | Campbell | 280/847 |
| 4,773,661 A | * | 9/1988 | Kosuge | 280/847 |
| 5,074,573 A | * | 12/1991 | Dick | 280/157 |
| 5,836,399 A | * | 11/1998 | Maiwald et al. | 172/509 |
| 5,850,727 A | * | 12/1998 | Fox | 56/1 |
| 5,951,123 A | * | 9/1999 | Bomstad et al. | 305/107 |
| 5,975,548 A | * | 11/1999 | Galli et al. | 280/157 |
| 6,053,517 A | * | 4/2000 | Lodi et al. | 280/157 |
| 6,336,677 B2 | * | 1/2002 | Scott | 296/198 |

* cited by examiner

Primary Examiner—Christopher P. Ellis
Assistant Examiner—Brian Swenson
(74) Attorney, Agent, or Firm—McKee, Voorhees & Sease, P.L.C.

(57) ABSTRACT

A fender skirt for use with a fender of a vehicle, such as a tractor, is provided. The fender skirt is disposed between the tire and the frame of the vehicle to effectively deflect debris away from the frame and engine compartment of the vehicle. The fender skirt preferably includes two rigid members spaced apart adjacent the inner side of the fender frame between the tire and the frame of the vehicle. A flexible skirt extends between the rigid members to form a canopy adjacent at least a portion of the tire.

18 Claims, 2 Drawing Sheets

FENDER SKIRT AND METHODS FOR USING SAME

BACKGROUND OF THE INVENTION

1. Field of the Invention

The present invention relates to vehicle accessories. More particularly, though not exclusively, the present invention relates to a fender skirt for use with the turning wheels and fenders on agricultural tractors and the like.

2. Problems in the Art

Farmers rely upon tractors to complete a variety of different tasks. Most heavy-duty tractors today include two front tires that turn for purposes of steering the tractor. It is not uncommon that rocks, mud and other debris are picked up on the tires and thrown onto the main body of the tractor, including the windshield and hood. This is particularly problematic when the rocks and the like contact the alternator, fan belt, radiator, oil lines, fuel lines, water lines and other elements both inside and outside the engine compartment. In addition to damaging parts on the tractor, flying debris can also scratch or mar the paint on the body of the tractor and obstruct the drivers vision through the windshield.

Several attempts have been made in the prior art to shield the engine compartment and frame of a tractor from rocks and debris picked up by the tires. These devices have generally suffered, however, from one or more shortcomings. For example, there is yet no solution to the problem caused by debris thrown toward the body of the tractor by tires that turn and steer the tractor. As the tires turn, the debris from the tires travels on various paths that cannot be deflected by prior art guards and fenders. Furthermore, these prior art devices are structurally different and comparably less effective than the instant invention.

Accordingly, a primary objective of the present invention is the provision of a fender skirt that can be adapted to the fender of a turning tire for an agricultural tractor and the like.

Another objective of the present invention is the provision of a fender skirt that effectively deflects mud, rocks, and other debris away from the frame or body of the tractor, including the engine compartment, windshield and hood.

Another objective of the present invention is the provision of a method for adapting fenders of turning tires to eliminate the aforementioned problems of flying debris.

A still further objective of the present invention is the provision of a fender skirt that is aesthetically pleasing, economical to manufacture, and durable in use.

These and other features become apparent from the following description of the invention.

SUMMARY OF THE INVENTION

The fender skirt of the present invention is for use with a fender of a vehicle, such as a tractor. The fender is an open fender that turns in relation to the tire or the wheel. The fender skirt is disposed between the tire and the frame of the vehicle with the fender skirt attached to the inner side of the fender or fender frame. A fastening mechanism operatively attaches the fender skirt to the inner side of the fender or fender frame. The fender skirt is positioned relative to the tire and the vehicle such that it deflects debris from the tire away from the main body or frame of the vehicle. In its preferred form, the fender skirt extends both lateral to and partially down the tire to increase the area for deflecting debris.

The present invention also includes a new method of preventing debris from damaging the tractor frame and contaminating the engine compartment. The method generally includes providing a fender skirt, positioning the fender skirt between a tire on the vehicle and the main body of the tractor, and attaching the fender skirt to a fender on the tractor such that it deflects debris away from the frame and engine compartment of the tractor.

The present invention effectively solves problems associated with flying debris from the steering tires of a tractor or similar vehicle. Because the fender skirt maintains a constant, spaced-apart relationship to the tire, it prevents debris from impacting the tractor frame and possibly contaminating the engine compartment. As a result, there is less risk that the tractor frame would become scratched or damaged during use. In addition, the various components in the engine compartment are less likely to wear out prematurely or otherwise become damaged.

BRIEF DESCRIPTION OF THE DRAWINGS

The present invention is illustrated by way of example and not limitation in the figures of the accompanying drawings, in which.

DETAILED DESCRIPTION OF THE INVENTION

The present invention will be described as it applies to its preferred embodiment. It is not intended that the present invention be limited to the described embodiment. It is intended that the present invention cover all modifications and alternatives which may be included within the spirit and broad scope of the invention.

The preferred embodiment is shown for use with a particular type of fender. Those skilled in the art will recognize that the structures and methods disclosed as part of the preferred embodiment can be adapted for other types of fenders having different dimensions, etc.

Figure 1:
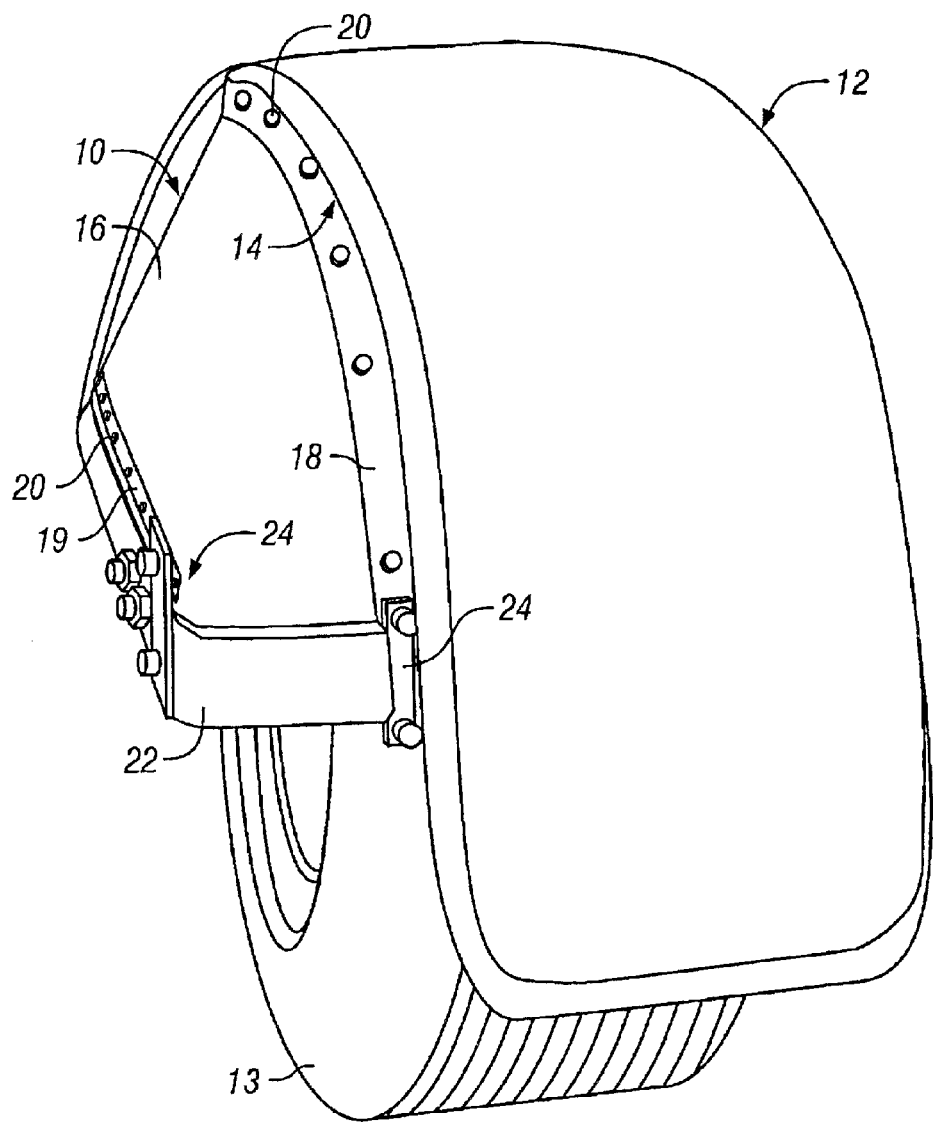
FIG. 1 is a perspective view of a preferred embodiment of the fender skirt of the present invention as shown mounted on a front fender of a steering tire of a tractor.

Now referring to the drawings, FIG. 1 illustrates a preferred embodiment of the fender skirt 10. The fender skirt 10 is shown for use with an open fender 12 that partially covers a tire 13 of a vehicle (not shown), such as a tractor. The tire 13 is one of two front steering tires on the vehicle. As such, the tire 13 turns for purposes of steering the vehicle. The fender 12 and fender frame 22 also turn in relation to the tire 13. Accordingly, the tire 13, fender 12 and fender frame 22 maintain a constant relationship to one another as the tire turns through various angles in steering the vehicle.

Figure 3:
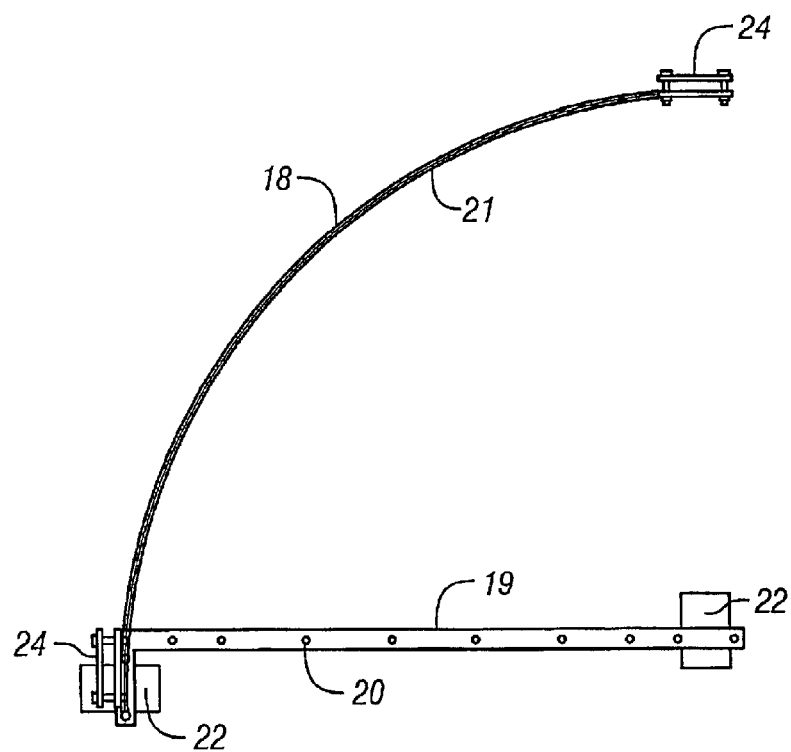
FIG. 3 is a front elevational view of the fender skirt.

The fender skirt 10 generally includes a first elongated rigid member 18 that is adapted to shape to or substantially fit the contour of the inner side 14 of the fender 12. As shown in FIG. 1, the first elongated rigid member 18 is an arcuate shaped member. Those skilled in the art will appreciate, however, that the first elongated member 18 can easily be adapted to fit a variety of different fenders. As shown in FIG. 3, a second arcuate shaped member 21 is preferably disposed beneath the first elongated rigid member 18 along the length of the fender skirt 16. The fender skirt 16 is held in place between both arcuate shaped members (18, 19) with the aid of a plurality of screws 20.

The fender skirt 10 also includes a second elongated rigid member 19 that is spaced apart from the first elongated rigid member 18. As shown in FIG. 1, the second elongated rigid member is generally planar and is positioned generally parallel to the inner side of the tire 13 and lateral to the first elongated rigid member 18. The flexible skirt 16 extends between the first and second elongated members (18, 19) and is attached thereto by the plurality of screws 20. As best shown in FIG. 1, the first and second elongated rigid members 18 and 19 are spaced such that the flexible skirt 16 forms a canopy around at least a portion of the tire 13.

In its preferred form, the second elongated member 19 is constructed of two pieces of similar shape that clamp around or secure the flexible skirt therebetween with screws 20.

It is preferred that the fender skirt 10 is disposed between the tire 13 and frame of the vehicle in order to effectively deflect mud, rocks, and other debris from contacting the vehicle frame. More particularly, the first elongated rigid member 18 of the fender skirt 10 extends through an angle of approximately 90 degrees, and the fender skirt 10 is positioned adjacent the upper rearward portion of the front tire 13. It has been shown that when the fender skirt 10 is disposed in such a manner, it deflects the majority of debris in an effective manner. Those skilled in the art will appreciate that the first elongated rigid member 18 could extend through a greater angle and thereby provide a larger canopy about the tire 13; however, debris that is picked up from the tire and thrown in the forward direction generally does not contact the vehicle frame, windshield or hood, or risk contamination of parts in the engine compartment.

The fender skirt 10 attaches to the frame of the fender 22 by means of fastening brackets 24. One or more fastening brackets 24 operatively attach the second elongated rigid member 19 to the fender frame 22. Similarly, one or more fastening brackets 24 attach the first elongated rigid member 18 to the fender frame 22. As noted previously, fenders and fender frames vary in size and structural dimensions. The fender skirt 10 of the present invention can be easily modified to work with a variety of different types of open fenders used on the front steering tire of a vehicle.

In its preferred form, the first and second elongated rigid members (18, 19) are strips of sheet metal, and the flexible skirt 16 is a flexible rubber material of appropriate size. A variety of other materials are suitable for the flexible skirt 16, including canvas.

Figure 2:
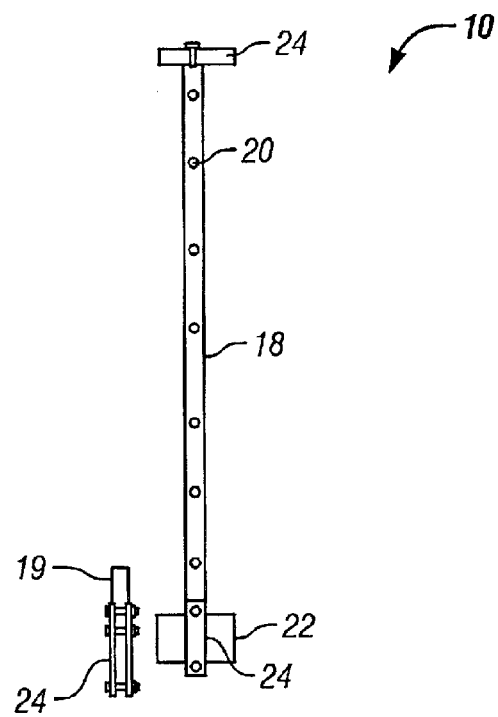
FIG. 2 is a side elevational view of the fender skirt.

FIGS. 2 and 3 are side and front views of the fender skirt 10. For sake of simplicity, the flexible skirt 16 is not shown in FIGS. 2 and 3.

In operation, debris from the tire 13 is deflected away from the frame and engine compartment of the vehicle by the fender skirt 10. Those skilled in the art will appreciate the that fender skirt 10 when installed maintains a constant spaced-apart relationship with the tire 13. In so doing, the fender skirt 10 moves or turns with the fender 12 and tire 13. This enables the fender skirt 10 of the present invention to continue to deflect debris away from the frame as the tire 13 turns through various angles. It can be appreciated that this offers significant advantages over a guard or shield that remains static and does not move in relation to the turning of the tire 13. Debris thrown from the tire 13 typically travels at certain angles relative to the tire 13. Of course, as the tire 13 turns the path of the debris will change. A simple guard or shield that does not adjust to or turn with the tire 13 cannot effectively deflect debris away from the frame of the vehicle and into to the engine compartment.

A general description of the present invention as well a preferred embodiment of the present invention has been set forth above. Those skilled in the art to which the present invention pertains will recognize and be able to practice additional variations in the structure and methods described which fall under the teachings of this invention. Accordingly, all such modifications and additions a deemed to be within the scope of the invention which is to be limited only by the claims appended hereto.

What is claimed is:

1. A fender skirt in combination with a turning front fender of a vehicle having a frame and a tire, the combination comprising:

an open fender that turns in relation to the tire of the vehicle, the fender having an inner side adjacent the frame of the vehicle;

a fender skirt disposed at an angle between the tire and the frame of the vehicle, the fender skirt attached to the inner side of the fender adjacent the upper rearward portion of the front tire; and a fastening mechanism for operatively attaching the fender skirt to the inner side of the fender;

whereby, the fender skirt deflects debris from the tire away from the frame of the vehicle.

2. The combination of claim 1 wherein the fender skirt includes a rigid arcuate member shaped to fit the inner side of the fender.

3. The combination of claim 2 wherein the fender skirt further includes a rigid elongated member spaced apart from the arcuate member.

4. The combination of claim 3 wherein the fender skit further includes a flexible skirt connected to and extending between the arcuate member the elongated member.

5. The combination of claim 4 wherein the flexible skirt is a rubber material.

6. The combination of claim 4 wherein the flexible skirt is canvas.

7. The combination of claim 5 wherein the arcuate member and the elongated member are metal.

8. The combination of claim 1 wherein the fender skirt is removably attached to the fender.

9. A fender skirt for use with a turning open front fenders of a vehicle having a frame and a tire, the fender having an inner side adjacent the frame, the fender skirt comprising:

a first elongated rigid member adapted to shape to the inner side of the fender;

a second elongated rigid member spaced apart from the first elongated rigid member;

a flexible skirt connected to and extending between the first and second elongated rigid members; and one or more fastening mechanisms operatively connecting the first and second elongated rigid members to the fender;

whereby, the fender skirt deflects debris from the tire away from the frame of the vehicle.

10. The fender skirt of claim 1 wherein the first elongated rigid member fender skirt is arcuate shaped to fit the inner side of the fender.

11. The fender skirt of claim 9 wherein the flexible skirt is a rubber material.

12. The fender skirt of claim 9 wherein the flexible skirt is canvas.

13. The fender skirt of claim 9 wherein the first and second elongated rigid members are metal.

14. The fender skirt of claim 9 wherein the fender skirt is removably attached to the fender.

15. A new method of preventing dirt and debris from damaging the main body of an agricultural tractor and contaminating the engine compartment, the tractor having a tire with a fender mounted on a fender frame that turns with the tire, the method comprising:

providing a fender skirt;

positioning the fender skirt at an angle between the tire and the main body of the tractor adjacent the upper rearward portion of the front tire; and attaching the fender skirt to the fender mounting frame so that the fender skirt deflects dirt and debris away from the main body of the tractor.

16. The method of claim 15 wherein the fender includes an inner side adjacent the engine compartment and the fender skirt includes an rigid arcuate member shaped to fit the inner side of the fender.

17. The method of claim 16 wherein the fender skirt further includes a rigid elongated member spaced apart from the arcuate member.

18. The method of claim 17 wherein the fender skirt further includes a flexible skirt connected to and extending between the arcuate member the elongated member.

* * * * *